(12) United States Patent
Hahn et al.

(10) Patent No.: US 12,730,586 B2
(45) Date of Patent: Sep. 8, 2026

(54) DATA STORAGE DEVICE AND METHOD FOR AVOIDING RETURNING ZEROS TO A HOST

(71) Applicant: Sandisk Technologies, Inc., Milpitas, CA (US)

(72) Inventors: Judah Gamliel Hahn, Ofra (IL); Ariel Navon, Revava (IL); Alexander Bazarsky, Holon (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 35 days.

(21) Appl. No.: 18/904,223

(22) Filed: Oct. 2, 2024

(65) Prior Publication Data

US 2026/0093416 A1 Apr. 2, 2026

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 3/06
See application file for complete search history.

(56) References Cited

U.S. PATENT DOCUMENTS 7,853,735 B2 12/2010 Jin et al.
10,607,712 B1 * 3/2020 Buxton ................. G06F 3/0619
10,741,249 B1 * 8/2020 Zampaglione ......... G11C 16/08
11,042,481 B1 * 6/2021 Virani ................. G06F 9/30047
2009/0157774 A1 6/2009 D'Amore
2012/0233434 A1 * 9/2012 Starks ................... G06F 3/0689 711/170
2017/0090815 A1 3/2017 Kelner et al.
2025/0021411 A1 * 1/2025 Kundu .................... G06F 9/547

OTHER PUBLICATIONS

Alizadeh, K. et al.; "LLM in a flash: Effcient Large Language Model Inference with Limited Memory"; downloaded from the Internet on Oct. 1, 2024 at https://arxiv.org/pdf/2312.11514; arXiV preprint arXiv:2312, 11514; Dec. 12, 2023; 23 pages.
"Nvme-write-zeroes"; Man Page; NVMe Manual; Jun. 3, 2024; 4 pages.
"Trim vs Writing Zones: The same?"; Superuser post on Stack Exchange; Stack Exchange; Apr. 12, 2014; 3 pages.

(Continued)

*Primary Examiner* — Khoa D Doan
(74) *Attorney, Agent, or Firm* — Crowell & Moring LLP

(57) ABSTRACT

A data storage device and method are provided for avoiding returning zeros to a host. In one embodiment, a data storage device is provided comprising a memory and one or more processors. The one or more processors, individually or in combination, are configured to: receive a command from a host to read data stored in a logical address of the memory; determine whether the data comprises all zeros; and in response to determining that the data comprises all zeros, provide the host with an indication that the data comprises all zeros instead of sending the data to the host. Other embodiments are disclosed.

16 Claims, 7 Drawing Sheets

(56) References Cited

OTHER PUBLICATIONS

"Nvm Express® NVM Command Set Specification"; Revision 1.0; downloaded from the Internet on Oct. 1, 2024 at NVM-Express-NVM-Command-Set-Specification-2021.06.02-Ratified.pdf (nvmexpress.org); NVM Express, Inc.; May 18, 2021; 105 pages.

"Rectifier (neural networks)"; Wikipedia entry; downloaded from the Internet on Oct. 1, 2024 at *Rectifier* (*neural networks*)—Wikipedia; Wikipedia; Aug. 5, 2024; 7 pages.

* cited by examiner

DATA STORAGE DEVICE AND METHOD FOR AVOIDING RETURNING ZEROS TO A HOST

BACKGROUND

The Non-Volatile Memory Express (NVMe) specification defines a "Write Zeros" command. When a host sends a Write Zeros command to a data storage device, the data storage device marks a range of logical addresses specified in the command to zero, rather than actually writing zeros in the memory of the data storage device. If the host later sends a read command to the data storage device specifying a logical address in the range, the data storage device foregoes reading the memory and simply returns zeros to the host as if those zeros were actually read from the memory.

DETAILED DESCRIPTION

Figures 1A, 1B, 1C:
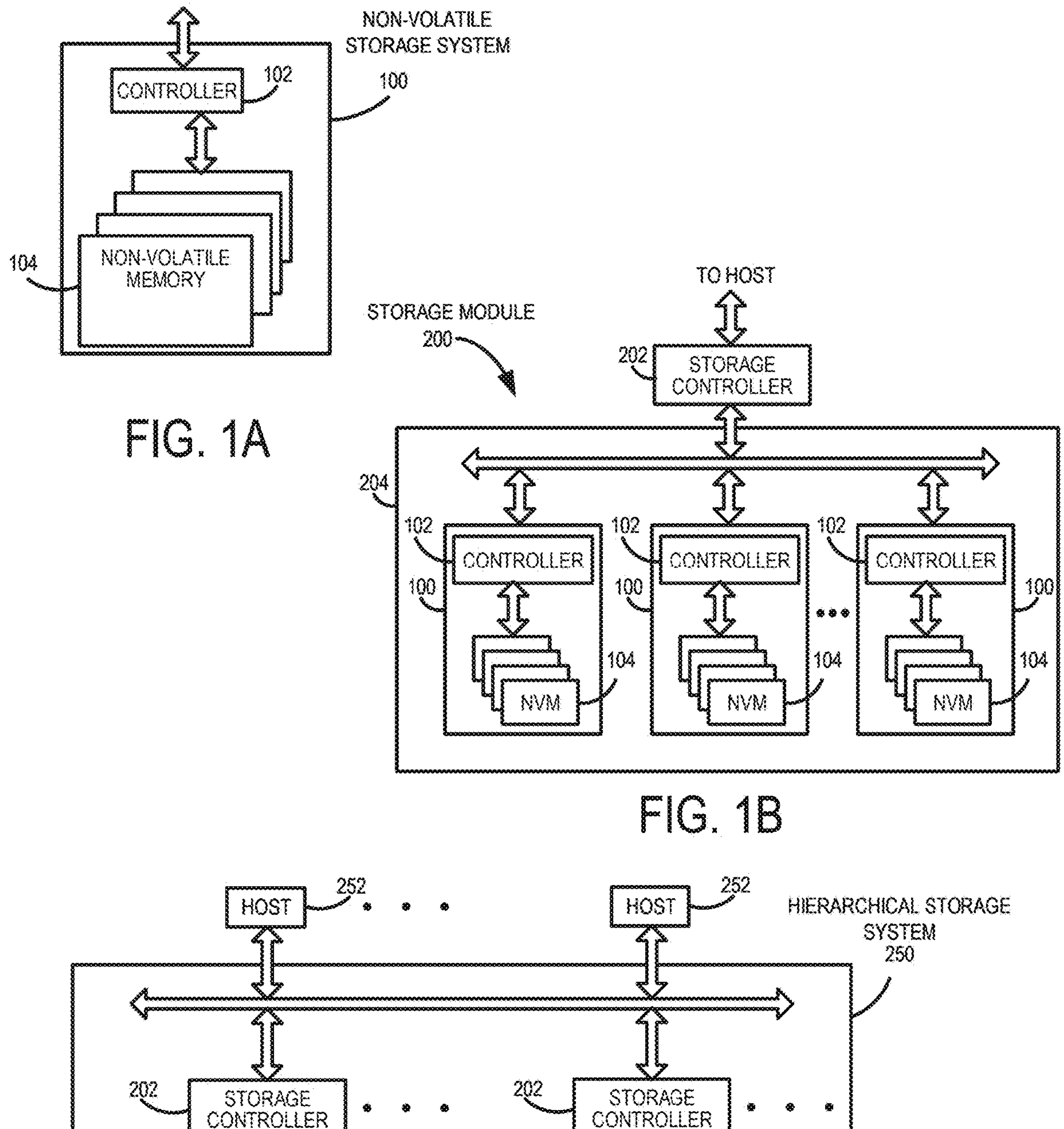
FIG. 1A is a block diagram of a data storage device of an embodiment.
FIG. 1B is a block diagram illustrating a storage module of an embodiment.
FIG. 1C is a block diagram illustrating a hierarchical storage system of an embodiment.

The following embodiments generally relate to a data storage device and method for avoiding returning zeros to a host. In one embodiment, a data storage device is provided comprising a memory and one or more processors. The one or more processors, individually or in combination, are configured to: receive a command from a host to read data stored in a logical address of the memory; determine whether the data comprises all zeros; and in response to determining that the data comprises all zeros, provide the host with an indication that the data comprises all zeros instead of sending the data to the host.

In some embodiments, the one or more processors, individually or in combination, are further configured to: in response to determining that the data does not comprises all zeros, send the data to the host.

In some embodiments, providing the host with the indication comprises writing a status code in a completion queue.

In some embodiments, the host is configured to interpret the status code to generate zeros that were not sent to the host by the data storage device.

In some embodiments, providing the host with the indication comprises using a form of compression that shows a location of the zeros.

In some embodiments, determining whether the data comprises all zeros comprises reading a physical location in the memory that is mapped to the logical address and determining whether the physical location stores all zeros.

In some embodiments, determining whether the data comprises all zeros comprises determining whether the logical address is mapped to a physical location in the memory.

In some embodiments, the data is associated with a large language model.

In some embodiments, the data comprises all of the data stored in the logical address.

In some embodiments, the data comprises a data segment stored in the logical address.

In some embodiments, the one or more processors, individually or in combination, are further configured to: receive, from the host, a size of the data segment.

In some embodiments, the memory comprises a three-dimensional memory.

In another embodiment, a method is provided that is performed in a data storage device comprising a memory. The method comprises: receiving a command from a host to read data stored in a logical address of the memory; determining whether the data comprises all zeros; in response to determining that the data does not comprise all zeros, sending the data to the host; and in response to determining that the data comprises all zeros, foregoing sending the data to the host.

In some embodiments, the method further comprises: in response to determining that the data comprises all zeros, providing the host with an indication that the data comprises all zeros.

In some embodiments, providing the host with the indication comprises writing a status code in a completion queue, and wherein the host is configured to interpret the status code to generate zeros that were not sent to the host by the data storage device.

In some embodiments, the host is configured to allocate a buffer to the data storage device that is initialized with zeros values, so foregoing sending the data to the host results in an indication that the data comprises all zeros.

In some embodiments, the method further comprises determining whether the data comprises all zeros comprises reading a physical location in the memory that is mapped to the logical address and determining whether the physical location stores all zeros.

In some embodiments, determining whether the data comprises all zeros comprises determining whether the logical address is mapped to a physical location in the memory.

In some embodiments, the method further comprises: sending, to the host, a bitmap of which physical region pages (PRP) list entries were skipped or a bitmap of which scatter gather lists (SGL) ranges were skipped.

In yet another embodiment, a data storage device is provided comprising: a memory; and means for: receiving a request from a host for data stored in the memory; determining whether all of the data comprises a same value; and in response to determining that all of the data comprises the same value, providing the host with an indication that all of the data comprises the same value instead of sending the data to the host.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
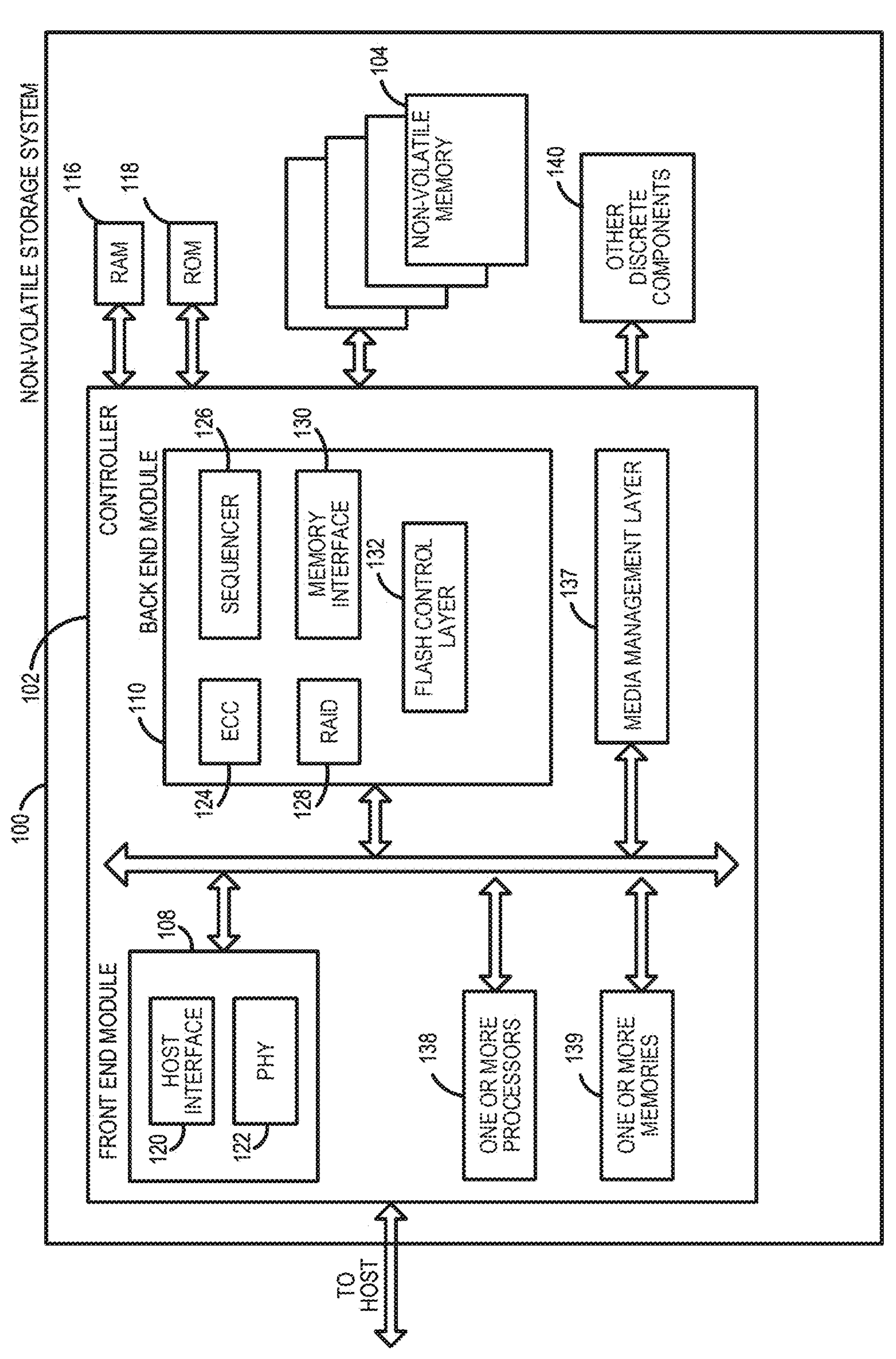
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
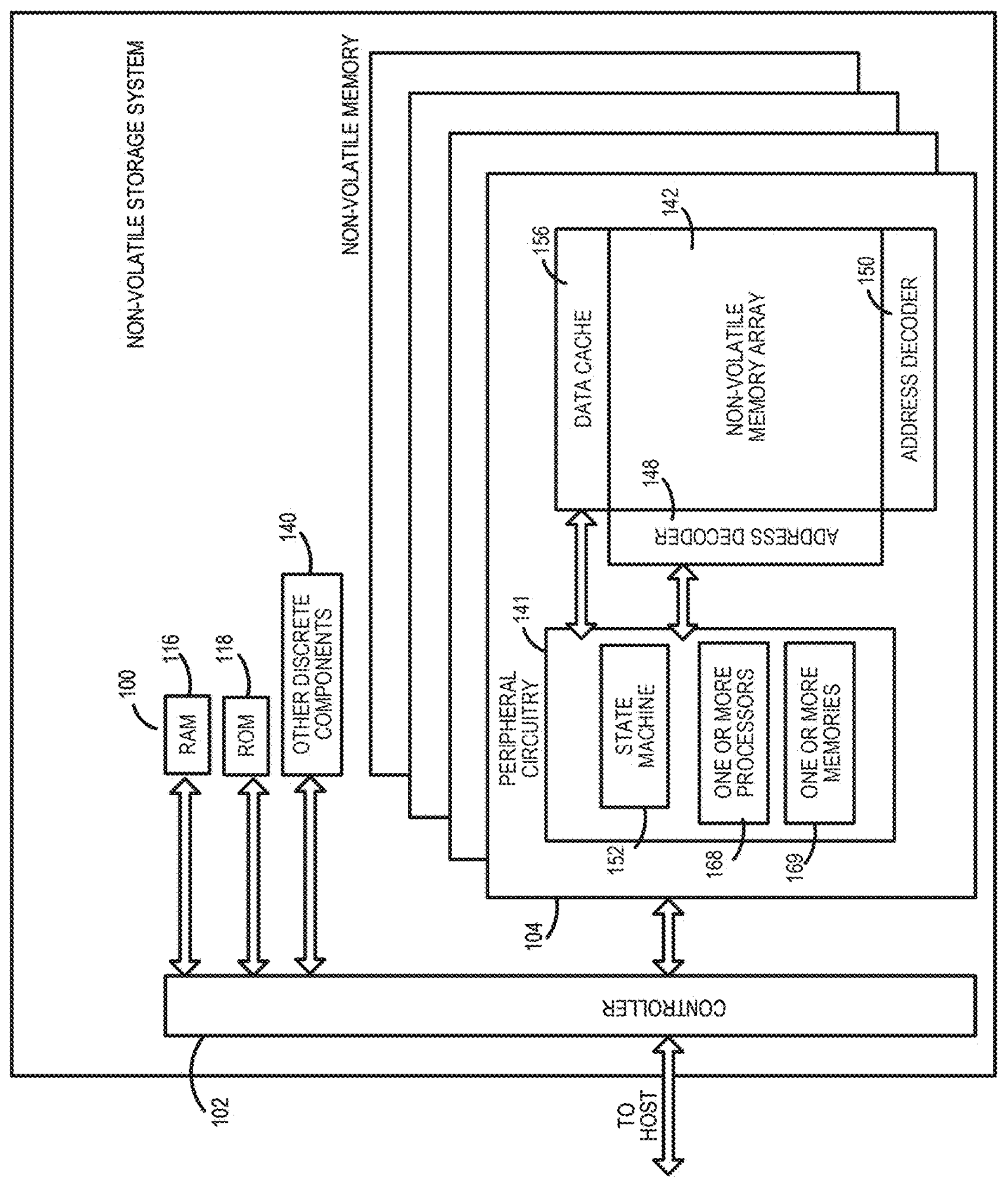
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
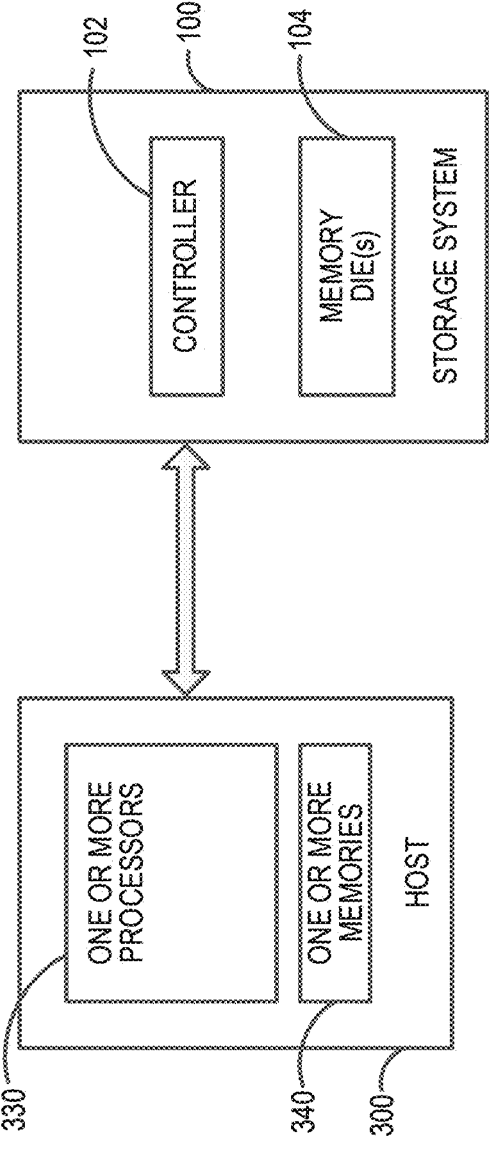
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

PCIe/NVMe commands from a host are typically submitted and completed using a series of queues (e.g., submission and completion queues). When input/output (I/O) commands are executed, the controller of the data storage device can perform direct memory access (DMA) transfers across the PCIe bus and then complete the command by writing to a completion queue in a memory in the host. The NVMe command "Write Zeros" can be used to set a range of logical blocks to zero. After a successful completion of this command, the value returned by subsequent reads of logical blocks in this range shall be all bytes cleared to Oh until a write occurs to this range.

If the Write-Zeros-Size-Limit (WZSL) field in the Identify Controller data structure is set to a non-zero value, and if bit 3 in the Optional NVMe Command Support (ONCS) field in the Identify Controller data structure is set to "1," then the WZSL field indicates the recommended maximum data size for the Write Zeros command, and any Write Zeros command that specifies a logical block range whose data size exceeds that recommended maximum may encounter delays in processing. Additionally, if the Write-Zeros-Size-Limit (WZSL) field in the Identify Controller data structure is set to a non-zero value, and if bit 3 in the ONCS field is cleared to "0," then the WZSL field indicates the data size limit for the Write Zeros command, and the controller shall abort any Write Zeros command that specifies a logical block range whose data size exceeds that limit with a status of Invalid Field in Command.

When the host sends the Write Zeros command to the data storage device, it is implied that the controller of the data storage device does not actually write zeros to the memory of the data storage device but instead marks the ranges. As such, when asked by the host to read a logical block address range that contains zeros, the controller will not actually read from the memory but instead will return zeros as if they were read from the memory. In this way, the controller of the data storage device would transfer the zeros to the host, just as it would transfer balanced data (0s and 1s) actually read from the memory.

The following embodiments present a Reverse-Write-Zeros (RWZ) command. With this command, when zeros are read from the memory 104 of the data storage device 100 (without being marked in advance by the host 300), the controller 102 of the data storage device 100 may simply indicate this to the host 300 and avoid the actual transfer of the zeros to the host 300, which saves latency and power. This can be especially useful in machine-learning-based workloads, such as when loading large language model (LLM) inference and feed forward network (FFN) models from the memory 104.

In one example operation of the RWZ command, an indication of a zero batch is sent to the host 300 after a read from the memory 104 is done by the controller 102 of the data storage device 100, which avoids the actual data transfer of zeros to the host 300. The indication can be sent to the host 300 in any suitable way, such as, but not limited to, through status codes of the NVMe interface or using a form of compression that shows the location of the zeros.

Figure 4:
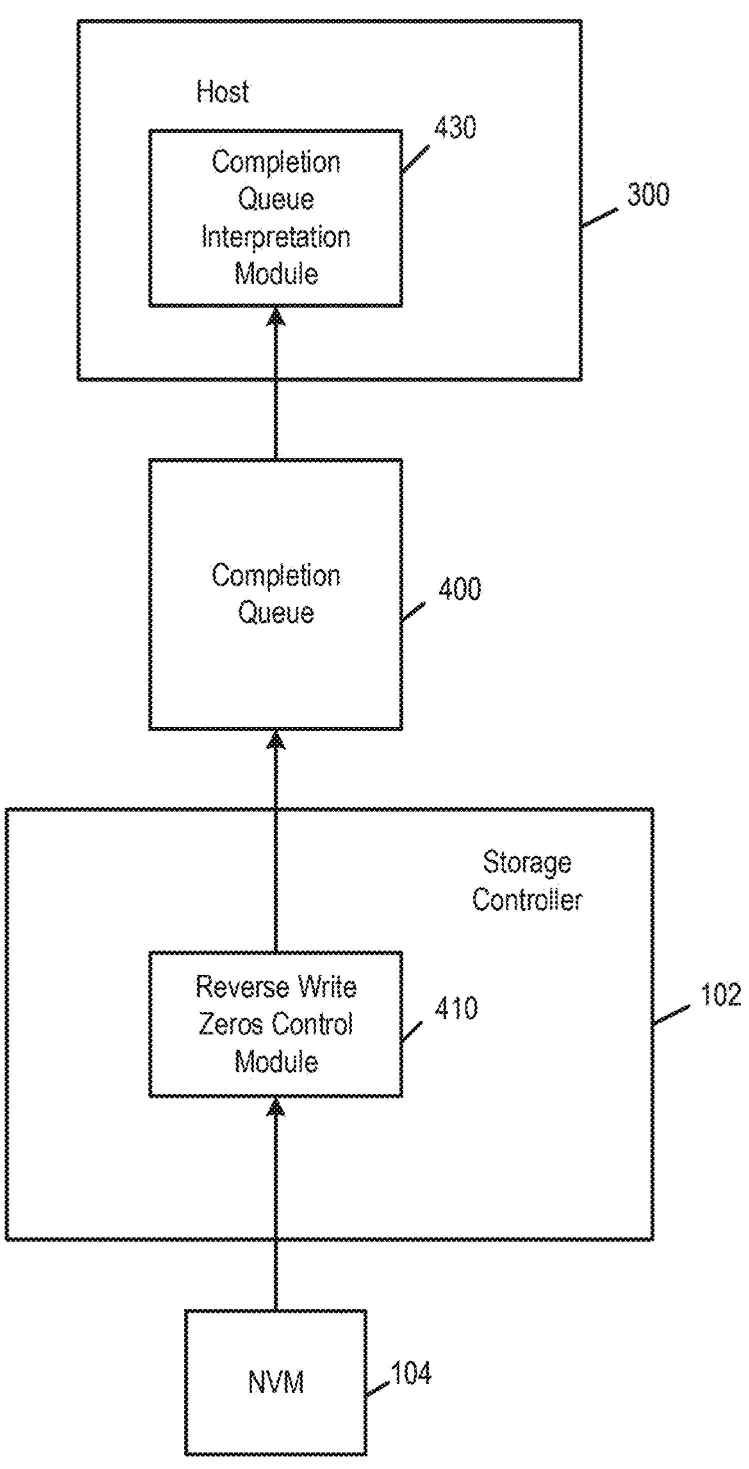
FIG. 4 is an illustration of an architecture of an embodiment.

Turning again to the drawings, FIG. 4 is an illustration of an architecture of an embodiment. As shown in FIG. 4, in this embodiment, a completion queue 400 (which can be stored in the host 300 or in the data storage device 100) is used to store a completion message after the controller 102 of the data storage device 100 executes a command stored in a submission queue (not shown). The controller 102 of the data storage device 100 comprises a reverse write zeros control module 410, and the host 300 comprises a completion queue interpretation module 430. The data storage device's one or more processors 138, individually or in combination, can be used to implement the reverse write zeros control module 410 by executing computer-readable program code/instructions stored in a memory of the data storage device 100. Similarly, the host's one or more processors 330, individually or in combination, can be used to implement the completion queue interpretation module 430 by executing computer-readable program code/instructions stored in the one or more memories 340 of the host 300.

In operation, the host 300 sends a read command to the data storage device 100, and the controller 102 of the data storage device 100 determines if the requested data is all zeros. The controller 102 can determine this by actually reading the data from a location in the memory 104 associated with a logical block address (LBA) in the read command. Alternatively, the controller 102 can make this determination without actually reading the memory 104, such as when a zero page is marked differently in a logical-to-physical address map (e.g., in the flash translation layer (FTL) and not mapped to a physical location in the non-volatile memory 104). The reverse write zeros control module 410 can determine which transfers are unnecessary and skip the unnecessary ones. A new status code in the command completion can be added to indicate that some ranges were skipped in the transfer and should be zeroed out by the host 300. In addition, a bitmap of which Physical Region Pages (PRP) list entries or Scatter Gather Lists (SGL) ranges were skipped may be returned as part of a metadata transfer or via additional fields in the complete queue entry. The completion queue interpretation module 430 can be used to interpret such an entry.

Figure 5:
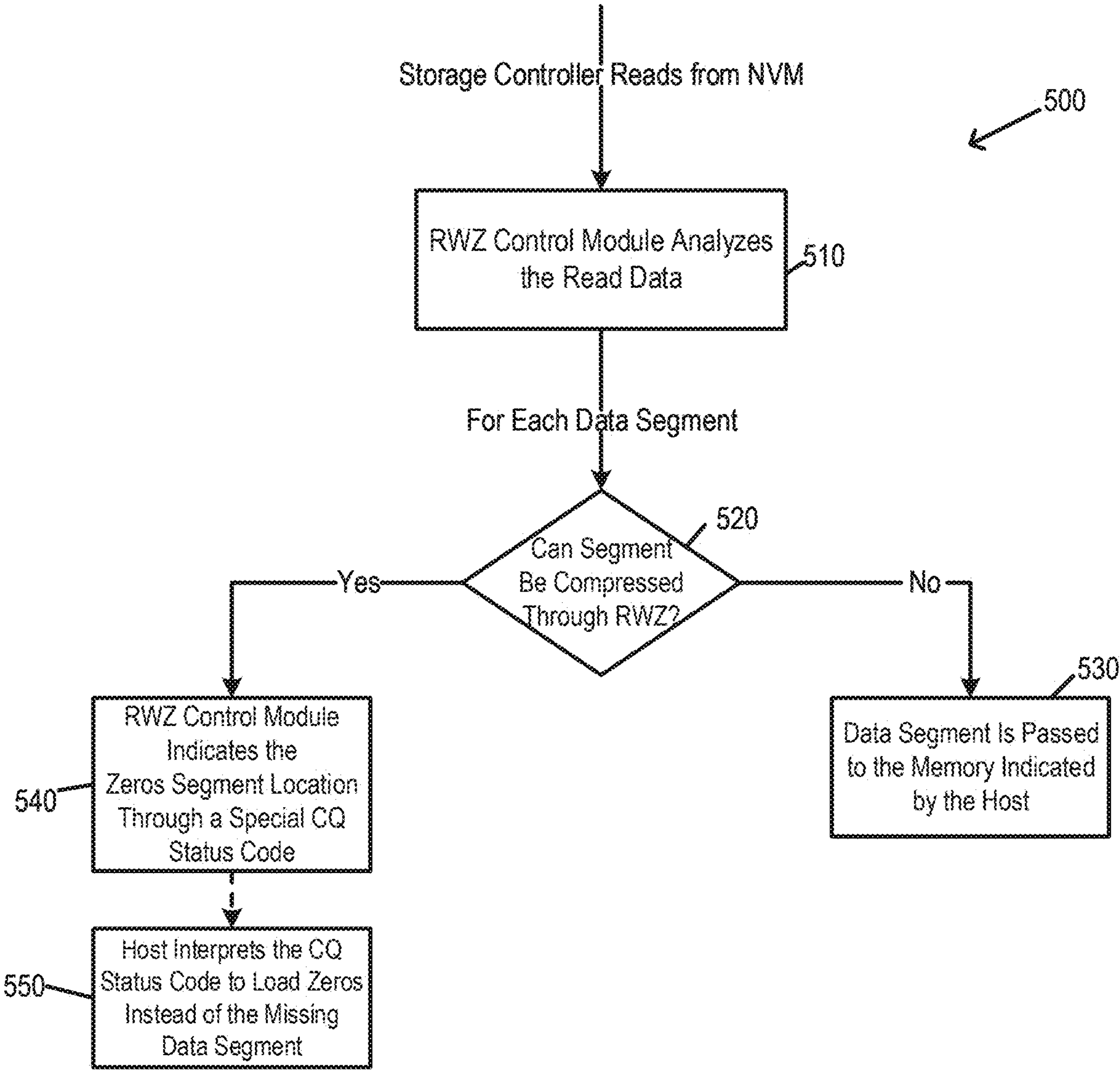
FIG. 5 is a flow chart of a method of an embodiment.

FIG. 5 is a flow chart 500 of a method that illustrates the operation of this example embodiment. As shown in FIG. 5, the reverse write zeros control module 410 implemented by the controller 102 analyzes data read from the memory 104 (510) and, for each data segment, determines if the segment can be RWZ-compressed because it contains all zeros (520). If the data segment is a mixed load of ones and zeros, the controller 102 sends the data segment to the memory indicated by the host 300 (e.g., the host memory 340) (530). However, if the data segment contains all zeros, the reverse write zeros control module 410 writes a special status code to the completion queue 420 that indicates the data segment contains all zeros (540). The completion queue interpretation module 430 in the host 300 can interpret this special status code to load zeros instead of the missing data segment (550).

Figure 6:
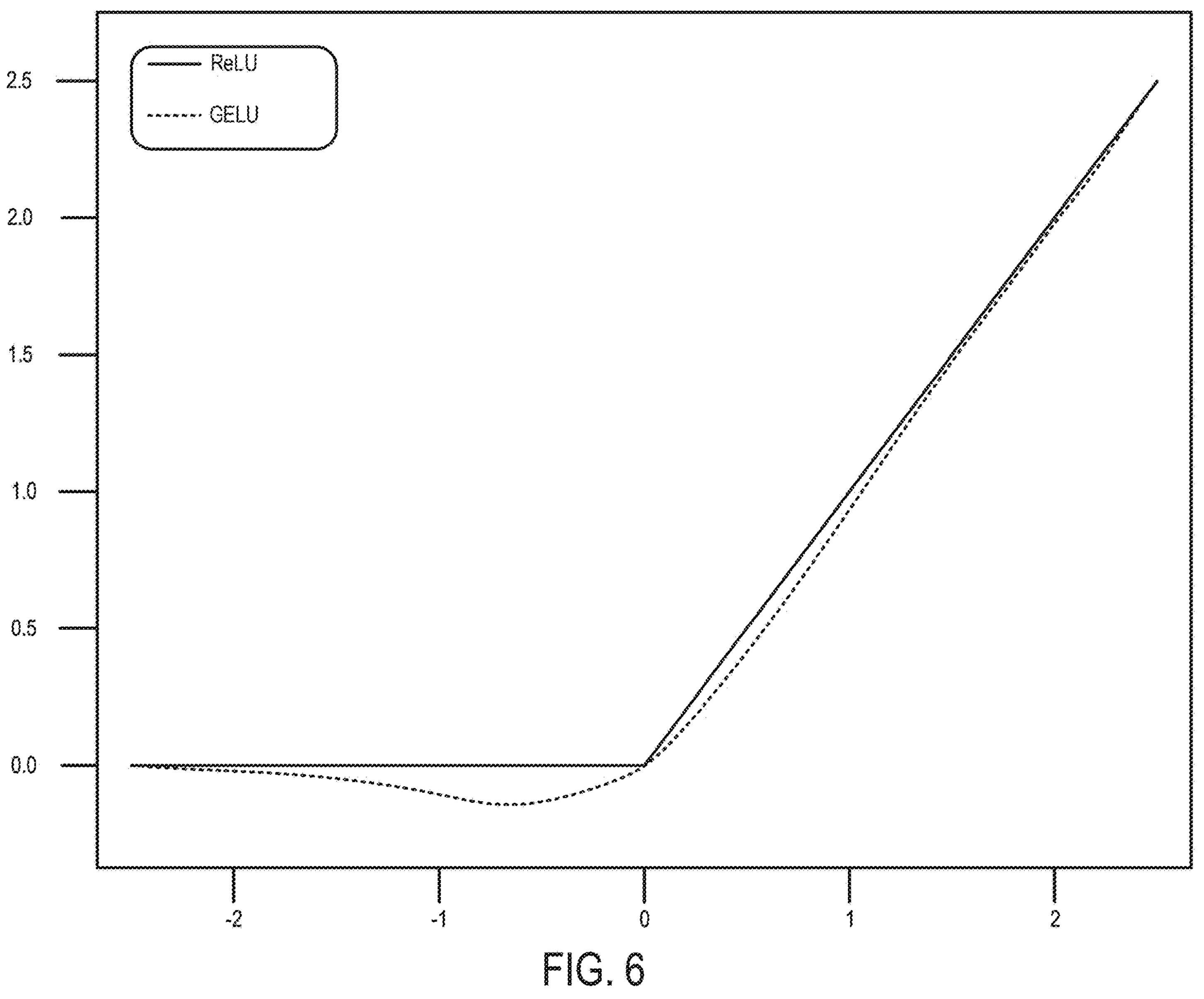
FIG. 6 is a graph of an embodiment.

There are several advantages associated with these embodiments, such as reducing the volume of transfers to the host 300 to reduce power consumption and read latency. One such use case is loading a large language model (LLM) (which can be a relatively-large size (e.g., tens of gigabytes)) from the memory 104. For example, the Open Pre-Trained (OPT) 6.7B model exhibits a notable 97% sparsity (weight values equal to 0). Other popular models also exhibit similar values of high sparsity. As shown in the graph in FIG. 6, a rectified linear unit (ReLU) activation function has input values smaller than zero. This causes much of the weight data to become zeroed, enhancing the value of these embodiments, as more sectors are expected to be zeroed when this popular activation function is used in the models. FIG. 6 also shows that a Gaussian-error linear unit (GELU) has input values are smaller than zero as well.

Several alternatives can be used with these embodiments. For example, in one alternative, the segment size can be controlled by the host 300 through an interface to allow flexibility between the potential transfer savings and the additional overhead in post-completion processing. In another alternative, when the host 300 allocates buffers to the data storage device 100, the host 300 can initialize them with zero values. Subsequently, when the controller 102 of the data storage device 100 detects that the data should be "0," the controller 102 can simply ignore those transactions, assuming the initial values were indeed "0." This approach can eliminate the need for changes in the completion phase while effectively reducing unnecessary traffic. Also, while these embodiments were described in the context of the data requested from the host have all zeros, similar methods can be used when all of the data comprises ones or some other value. Other alternatives can be used.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:

a memory; and one or more processors, individually or in combination, configured to:

receive a command from a host to read data stored in a logical address of the memory;

determine whether the data comprises all zeros; and in response to determining that the data comprises all zeros, provide the host with an indication that the data comprises all zeros instead of sending the data to the host, wherein providing the host with the indication comprises writing a status code in a completion queue, and wherein the host is configured to interpret the status code to generate zeros that were not sent to the host by the data storage device.

2. The data storage device of claim 1, wherein the one or more processors, individually or in combination, are further configured to:

in response to determining that the data does not comprises all zeros, send the data to the host.

3. The data storage device of claim 1, wherein determining whether the data comprises all zeros comprises reading a physical location in the memory that is mapped to the logical address of the memory and determining whether the physical location stores all zeros.

4. The data storage device of claim 1, wherein determining whether the data comprises all zeros comprises determining whether the logical address of the memory is mapped to a physical location in the memory.

5. The data storage device of claim 1, wherein the data is associated with a large language model.

6. The data storage device of claim 1, wherein the data comprises all of the data stored in the logical address of the memory.

7. The data storage device of claim 1, wherein the data comprises a data segment stored in the logical address of the memory.

8. The data storage device of claim 7, wherein the one or more processors, individually or in combination, are further configured to:

receive, from the host, a size of the data segment.

9. The data storage device of claim 1, wherein the memory comprises a three-dimensional memory.

10. A method comprising:

performing in a data storage device comprising a memory:

receiving a command from a host to read data stored in a logical address of the memory;

determining whether the data comprises all zeros;

in response to determining that the data does not comprise all zeros, sending the data to the host; and in response to determining that the data comprises all zeros, foregoing sending the data to the host;

wherein the host is configured to allocate a buffer to the data storage device that is initialized with zeros values, so foregoing sending the data to the host results in an indication that the data comprises all zeros.

11. The method of claim 10, further comprising:

in response to determining that the data comprises all zeros, providing the host with an indication that the data comprises all zeros.

12. The method of claim 11, wherein providing the host with the indication comprises writing a status code in a completion queue, and wherein the host is configured to interpret the status code to generate zeros that were not sent to the host by the data storage device.

13. The method of claim 10, wherein determining whether the data comprises all zeros comprises reading a physical location in the memory that is mapped to the logical address of the memory and determining whether the physical location stores all zeros.

14. The method of claim 10, wherein determining whether the data comprises all zeros comprises determining whether the logical address of the memory is mapped to a physical location in the memory.

15. The method of claim 10, further comprising:

sending, to the host, a bitmap of which physical region pages (PRP) list entries were skipped or a bitmap of which scatter gather lists (SGL) ranges were skipped.

16. A data storage device comprising:

a memory; and means for:

receiving a request from a host for data stored in the memory;

determining whether the data comprises all zeros; and in response to determining that all of the data comprises all zeros, providing the host with an indication that the data comprises all zeros instead of sending the data to the host, wherein providing the host with the indication comprises using a form of compression that shows a location of the zeros.

* * * * *